United States Patent
Visintainer et al.

(10) Patent No.: US 11,315,424 B2
(45) Date of Patent: *Apr. 26, 2022

(54) AUTOMOTIVE DRIVER ASSISTANCE

(71) Applicant: C.R.F. SOCIETA' CONSORTILE PER AZIONI, Orbassano (IT)

(72) Inventors: Filippo Visintainer, Orbassano (IT); Andrea Steccanella, Orbassano (IT); Paolo Denti, Orbassano (IT); Marco Darin, Orbassano (IT); Luciano Altomare, Orbassano (IT); Alessandro Marchetto, Orbassano (IT)

(73) Assignee: C.R.F. SOCIETA' CONSORTILE PER AZIONI, Orbassano (IT)

( * ) Notice: Subject to any disclaimer, the term of this patent is extended or adjusted under 35 U.S.C. 154(b) by 19 days.
This patent is subject to a terminal disclaimer.

(21) Appl. No.: 17/041,554

(22) PCT Filed: Sep. 24, 2019

(86) PCT No.: PCT/IB2019/058090
§ 371 (c)(1),
(2) Date: Sep. 25, 2020

(87) PCT Pub. No.: WO2020/065527
PCT Pub. Date: Apr. 2, 2020

(65) Prior Publication Data
US 2021/0118295 A1    Apr. 22, 2021

(30) Foreign Application Priority Data
Sep. 24, 2018  (IT) ..................... 102018000008875

(51) Int. Cl.
*G08G 1/0968*  (2006.01)
*H04W 4/46*    (2018.01)
(Continued)

(52) U.S. Cl.
CPC ... *G08G 1/096861* (2013.01); *B60R 16/0231* (2013.01); *G01C 21/3691* (2013.01);
(Continued)

(58) Field of Classification Search
None
See application file for complete search history.

(56) References Cited

U.S. PATENT DOCUMENTS 6,450,128 B1 * 9/2002 Boyce .................. A01K 15/022
                                                            119/713
6,735,515 B2 * 5/2004 Bechtolsheim .... G01C 21/3667
                                                            340/990
(Continued)

FOREIGN PATENT DOCUMENTS

EP      3121802 A1    1/2017
EP      3179212 A1 *  6/2017  ............. G08G 1/163
(Continued)

OTHER PUBLICATIONS

International Search Report and Written Opinion of the International Searching Authority, issued in PCT/IB2019/058090 dated Nov. 22, 2019; ISA/EP.

*Primary Examiner* — Fekadeselassie Girma
(74) *Attorney, Agent, or Firm* — Harness, Dickey & Pierce, P.L.C.

(57) ABSTRACT

An advanced driver assistance system configured to implement one or more automotive V2V applications designed to assist a driver in driving a Host Motor-Vehicle. The advanced driver assistance system is configured to be connectable to an automotive on-board communication network to communicate with automotive on-board systems to implement one or different automotive functionalities aimed at assisting the driver in driving the Host Motor-Vehicle,
(Continued)

controlling the Host Motor-Vehicle, and informing the driver of the Host Motor-Vehicle of the presence of Relevant Motor-Vehicles deemed to be relevant to the driving safety of the Host Motor-Vehicle. The advanced driver assistance system comprises an automotive V2V communication system operable to communicate with automotive V2V communication systems of Remote Motor-Vehicles via V2V messages containing motor-vehicle position-related, motion-related, and state-related data. The advanced driver assistance system is further configured to receive V2V messages transmitted by V2V communications systems of Remote Motor-Vehicles; identify from among the Remote Motor-Vehicles in communication with the Host Motor-Vehicle, Nearby Motor-Vehicles that may represent potential threats to the driving safety of the Host Motor-Vehicle, based on motor-vehicle position-related, motion-related, and state-related data in received V2V messages and on motor-vehicle position-related, motion-related, and state-related data of the Host Motor-Vehicle; and process the data contained in the V2V messages received from the Nearby Motor-Vehicles to identify from among the Nearby Motor-Vehicles Relevant Motor-Vehicles that may be relevant to the automotive functionalities aimed at assisting the driver in driving the Host Motor-Vehicle, controlling the Host Motor-Vehicle, at informing the driver of the Host Motor-Vehicle of the presence of Relevant Motor-Vehicles deemed to be relevant to the driving safety, and dispatch on the automotive on-board communication network a list of virtual objects containing information on the Host Motor-Vehicle and on the Relevant Motor-Vehicles, for exploitation by one or more of the functionalities aimed at assisting the driver in driving the Host Motor-Vehicle, controlling the Host Motor-Vehicle, and informing the driver of the Host Motor-Vehicle of the presence of the Relevant Motor-Vehicles deemed to be relevant to the driving safety of the Host Motor-Vehicle, or exploit the information on the Host Motor-Vehicle and on the Relevant Motor-Vehicles in the implementation of one or more of the automotive functionalities aimed at assisting the driver in driving the Host Motor-Vehicle, controlling the Host Motor-Vehicle, and informing the driver of the Host Motor-Vehicle of the presence of the Relevant Motor-Vehicles and of relevant events deemed to be relevant to the driving safety of the Host Motor-Vehicle.

9 Claims, 6 Drawing Sheets

(51) Int. Cl.
| | |
|---|---|
| *H04W 4/48* | (2018.01) |
| *B60R 16/023* | (2006.01) |
| *G01C 21/36* | (2006.01) |
| *G01S 19/13* | (2010.01) |
| *G07C 5/00* | (2006.01) |
| *G08G 1/16* | (2006.01) |
| *H04W 84/00* | (2009.01) |

(52) U.S. Cl.
CPC .............. *G01S 19/13* (2013.01); *G07C 5/008* (2013.01); *G08G 1/096827* (2013.01); *G08G 1/096833* (2013.01); *G08G 1/162* (2013.01); *G08G 1/166* (2013.01); *H04W 4/46* (2018.02); *H04W 4/48* (2018.02); *H04W 84/005* (2013.01)

(56) References Cited

U.S. PATENT DOCUMENTS

| | | | | |
|---|---|---|---|---|
| 8,717,192 | B2* | 5/2014 | Durekovic | G08G 1/164 |
| | | | | 340/903 |
| 9,330,564 | B2 | 5/2016 | Durekovic et al. | |
| 9,799,216 | B2 | 10/2017 | Durekovic et al. | |
| 2009/0143964 | A1* | 6/2009 | Navone | G08G 1/096827 |
| | | | | 701/117 |
| 2009/0292459 | A1* | 11/2009 | Zuccotti | G08G 1/096716 |
| | | | | 701/532 |
| 2010/0198513 | A1* | 8/2010 | Zeng | G01S 17/931 |
| | | | | 701/300 |
| 2012/0086582 | A1* | 4/2012 | Durekovic | G08G 1/161 |
| | | | | 340/903 |
| 2018/0194352 | A1* | 7/2018 | Avedisov | B60W 30/09 |
| 2019/0016338 | A1* | 1/2019 | Ishioka | B60W 30/18163 |
| 2021/0024061 | A1* | 1/2021 | Visintainer | G08G 1/164 |
| 2021/0046941 | A1* | 2/2021 | Visintainer | B60W 50/0097 |
| 2021/0118295 | A1* | 4/2021 | Visintainer | G08G 1/09675 |

FOREIGN PATENT DOCUMENTS

| | | | | |
|---|---|---|---|---|
| WO | WO-2017098486 A1 | | 6/2017 | |
| WO | WO-2018106757 A1 | | 6/2018 | |
| WO | WO-2020065524 A1 * | | 4/2020 | ............ B60W 30/16 |

* cited by examiner

AUTOMOTIVE DRIVER ASSISTANCE

CROSS-REFERENCE TO RELATED APPLICATIONS

This application is a U.S. National Phase Application under 35 U.S.C. 371 of International Application No. PCT/IB2019/058090, filed Sep. 24, 2019, which claims the benefit of Italian patent application no. 102018000008875 filed on Sep. 24, 2018. The entire disclosures of the above-identified applications are incorporated herein by reference.

TECHNICAL FIELD OF THE INVENTION

The invention relates to automotive driver assistance.

The invention finds application in any type of road motor-vehicles, regardless of whether it is used for the transportation of people, such as a car, a bus, a camper, etc., or for the transportation of goods, such as an industrial vehicle (truck, B-train, trailer truck, etc.) or a light or medium-heavy commercial vehicle (light van, van, pick-up trucks, etc.).

STATE OF THE ART

As it is known, over the last few years many car manufacturers have invested in the research for automotive advanced driver assistance systems (ADAS) for safety and better driving performances.

For this reason, the ADASs are one of the most quickly growing segments of the automotive industry. The safety features of these systems are designed to avoid collisions and accidents, offering technologies that warn drivers of potential problems, or to avoid collisions through the implementation of safety measures and taking over control of the motor-vehicles. The adaptive features can automate the lighting, provide an adaptive cruise control, automate braking, incorporate GPS signals/traffic, connect smartphones, warn drivers of other vehicles of possible dangers, keep drivers in the right lane or show blind spots.

The ADAS technology is based on vision/camera systems, sensory systems, automotive data networks, Vehicle-to-Vehicle (V2V) communication systems and Vehicle-to-Infrastructure (V2I) communication systems.

The next generation advanced driver assistance systems will exploit wireless connections to a greater extent, in order to offer an added value to the V2V and V2I communication.

Advanced driver assistance systems are destined to become much more popular in the next ten years than they are nowadays, as they will help reach the goals set by the European Union for the 2011-2020 decade in terms of reduction of road accidents.

Indeed, according to the studies carried out by the Accident Research of the German Association of Insurers (GDV), lane assist systems alone are capable of preventing up to 15% of road accidents, whereas intersection assistance can avoid up to 35% of road accidents.

Technological developments, such as the integration of radars and cameras, and the merging of sensors of multiple applications are likely to cause a reduction of costs, which could lead to a more significant penetration of advanced driver assistance systems in the compact vehicle market within 2018.

EP 3 121 802 A1 discloses a motor vehicle alert system based on vehicle dynamics input and comprising a communication module positioned in a host vehicle to receive and send vehicle data in a vehicle mobility data format. A list generator in communication with the communication module generates the data of the motor-vehicle as specific vehicle identification data in a track list to distinguish a sensed motor-vehicle and at least another motor-vehicle positioned proximate to the Host Motor-Vehicle. A tracker module in communication with the list generator periodically updates the vehicle data for the sensed vehicle and the other vehicle. A transient condition data device generates data identifying when a transient condition of the sensed vehicle is present. A message standard conformance module receives the data identifying the transient condition and forwards the data identifying the transient condition to the communication module for transmission to at least another vehicle proximate to the host vehicle.

US 2010/198513 A1 discloses a vehicle awareness system for monitoring remote vehicles relative to a host vehicle. The vehicle awareness system includes at least one object sensing device and a vehicle-to-vehicle V2V communication device. A data collection module is provided for obtaining a sensor object data map and V2V object data map. Furthermore, there is provided a fusion module, which merges the sensor object data map and V2V object data map for generating a cumulative object data map. Finally, a tracking module estimates the relative position of the remote vehicles to the host vehicle.

WO 2018/106757 A1 discloses a system for generating risk indicators, which involves determining a route of a vehicle and routes of external objects. The vehicle route is determined using vehicle route data including a vehicle location and a vehicle destination. The external object routes are determined using external object route data including external object locations and external object destinations. Based on a comparison between the vehicle route data and the external object route data, external object routes that satisfy a proximity criterion are determined. Risk data for the vehicle are generated based on a state of the vehicle and on states of the external objects corresponding to the external object routes that satisfy the proximity criterion. In response to determining that the risk data satisfies a risk criterion, at least one risk indicator is generated.

SUBJECT-MATTER AND SUMMARY OF THE INVENTION

The Applicant decided to carry out a study aimed at defining an automotive advanced driver assistance system which is capable of simultaneously fulfilling a number of requirements and, in particular: i) complies with the requirements of the family of SAE (Society of Automotive Engineers) standards DSRC J2945-J2735; ii) is potentially capable of fulfilling the ETSI ITS G5 European standard; iii) complies with the American rule (Notice of Proposed Rule-Making"-NPRM— January 2017) established by the National Highway Traffic Safety Administration (NHTSA) for "*Federal Motor Vehicle Safety Standards (FMVSS) No. 150: Vehicle-To-Vehicle (V2) Communication Technology for Light Vehicles*", (based on SAE J2735 and SAE J2945), which provides for all light motor vehicles to be equipped with V2V communication technologies which allow them to send to and receive from other vehicles Basic Safety Messages (BSM), though without requiring the implementation of functionalities; and iv) further provides, as an output, data capable of enabling the following six applications discussed in the SAE J2945/1 standard: Electronic Emergency Brake Lights (EEBL), Forward Collision Warning (FCW), Blind Spot Warning (BSW)/Lane Change Warning (LCW), Intersection Movement Assist (IMA), Left Turn Assist (LTA), and Control Loss Warning (LCW).

Furthermore, the study carried out by the Applicant is also aimed at defining an automotive advanced driver assistance system which implements applications based on a V2I communication or on a combined V2V-V2I communication, according to the SAE J2735 standard and, similarly, to the ETSI ITS-G5 standard, which are based on infrastructure and relative messaging services provided for by the state of the art and, in particular, on: warnings of relevant and/or dangerous road events (traffic, weather, still vehicle), dynamic speed limits, information concerning road signs (prohibitory signs, mandatory signs, danger warning signs, suggestion signs), traffic light phases and local maps, in particular at intersections.

According to the invention, an automotive driver assistance system is provided, as claimed in the appended claims.

DETAILED DESCRIPTION OF PREFERRED EMBODIMENTS OF THE INVENTION

The invention will now be described in detail with reference to the accompanying figures, so as to allow a person skilled in the art to carry it out and to use it. Possible changes to the embodiments described herein will be immediately evident to skilled people and the generic principles described herein can be applied to other embodiments and applications without for this reason going beyond the scope of protection of the invention set forth in the appended claims. Therefore, the invention cannot be considered as limited to the embodiments described and shown herein, but it has to be associated with the widest scope of protection possible in accordance with the principles and the features described and claimed herein.

The present invention was developed following the criteria indicated hereinafter: implementing V2X services with a minimum impact on the architecture and on the existing on-vehicle systems, making the invention easy to be scaled and adjusted to different electrical-electronic architectures, taking advantage of the existing prior development and not setting limits to the implementation of the above-mentioned six SAE applications and V2I applications, thus allowing these applications to be freely implementable both in a standalone automotive electronic processing unit, which, for instance, could be the case of specific V2X functionalities, such as the EEBL functionality, and in external automotive electronic control units, which could be the case of the BSW functionality, thus making the automotive electronic processing unit independent, a sort of additional sensor for these external automotive electronic control units.

Figure 1:
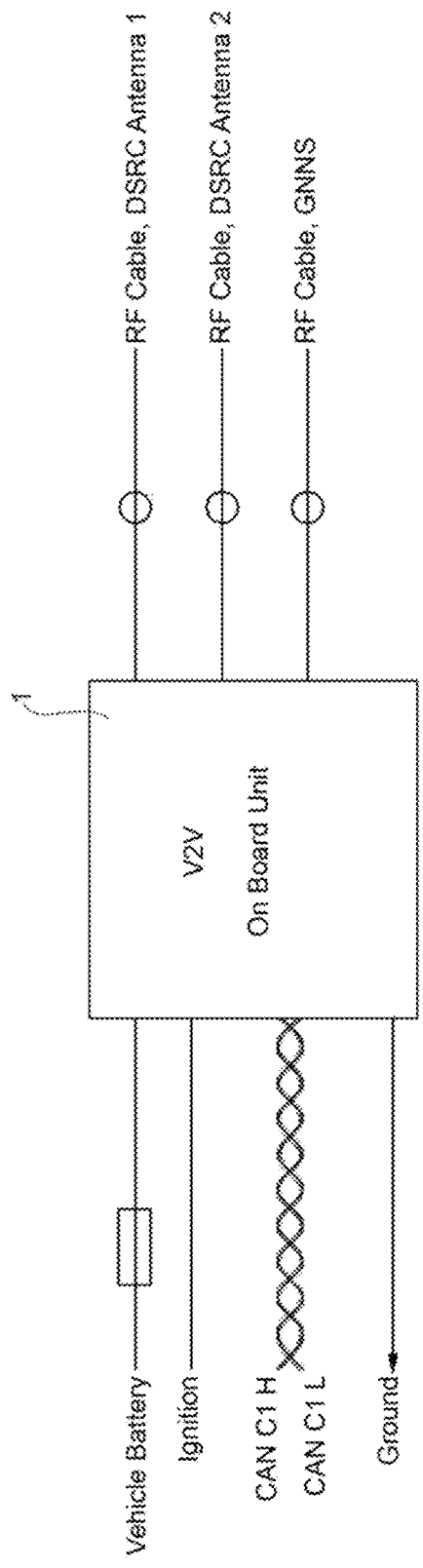
FIG. 1 shows a schematic representation of the connections of an automotive driver assistance system according to the invention in the form of an automotive standalone on-board unit.
Figure 2:
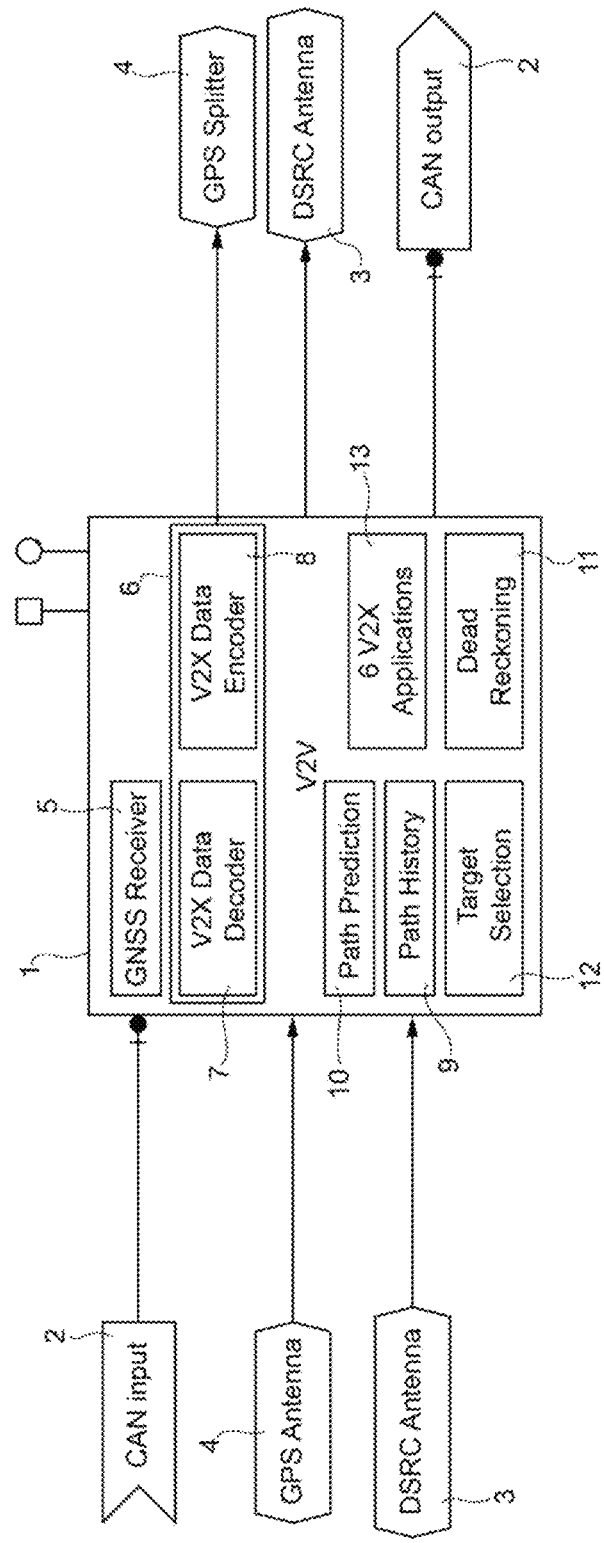
FIG. 2 shows a block diagram of the driver assistance system in FIG. 1.

The above-listed criteria led to the development of an automotive advanced driver assistance system schematically shown in FIGS. 1 and 2 and indicated, as a whole, with reference numeral 1, namely in the form of an automotive standalone on-board unit (OBU) designed so as to be installable on motor-vehicles, hereinafter referred to as Host Motor-Vehicles, and be connectable to automotive on-vehicle systems through wirings that allow the automotive standalone on-board unit 1 to be connectable to a battery, to an ignition switch, to an automotive on-board communication network 2, in the example shown herein a CAN network, through a network interface, to a DSRC (Dedicated Short-Range Communication) antenna 3, which is conveniently in the form of one single transmitting-receiving DSRC antenna, but could also be in the form of separate transmitting and receiving DSRC antennas, to transmit and receive RF signals encoding Basic Safety Messages and Infrastructure Messages, and to a GNSS (Global Navigation Satellite System) antenna 4, as well as, optionally, to a further data line (not shown), e.g., an Ethernet line, for updating the firmware of the automotive standalone on-board unit 1.

Through the CAN interface, the automotive standalone on-board unit 1 receives input data on the state of the Host Motor-Vehicle on which it is mounted, such as wheel speed, steering angle, brake pump pressure, longitudinal and lateral accelerations, accelerator pedal position, braking state, direction indicator state, etc., as well as Basic Safety Messages and Infrastructure Messages respectively transmitted by Nearby Motor-Vehicles and by the infrastructure (road side units—RSU—installed on road side posts, panels, or traffic lights) and received by the Host Motor-Vehicle through V2V and V2I communication systems.

The automotive standalone on-board unit 1 is programmed to process the received data to extract information on objects or obstacles present in the space surrounding the Host Motor-Vehicle and that might be a potential threat to the driving safety of the Host Motor-Vehicle, as well as into dynamic V2X information that may be used to manually or automatically affect the manoeuvre of the Host Motor-Vehicle (road events, speed limits, traffic light phases, road local topology).

The automotive standalone on-board unit 1 is further programmed to dispatch on the CAN, through the same CAN bus from which it receives the input data or through a dedicated CAN bus, depending on the design and load features of the input CAN bus, information representing objects or obstacles present in the space surrounding the Host Motor-Vehicle that can be potential threats to the driving safety of the Host Motor-Vehicle, as well as, if necessary, the aforesaid dynamic V2X information.

Figure 3:
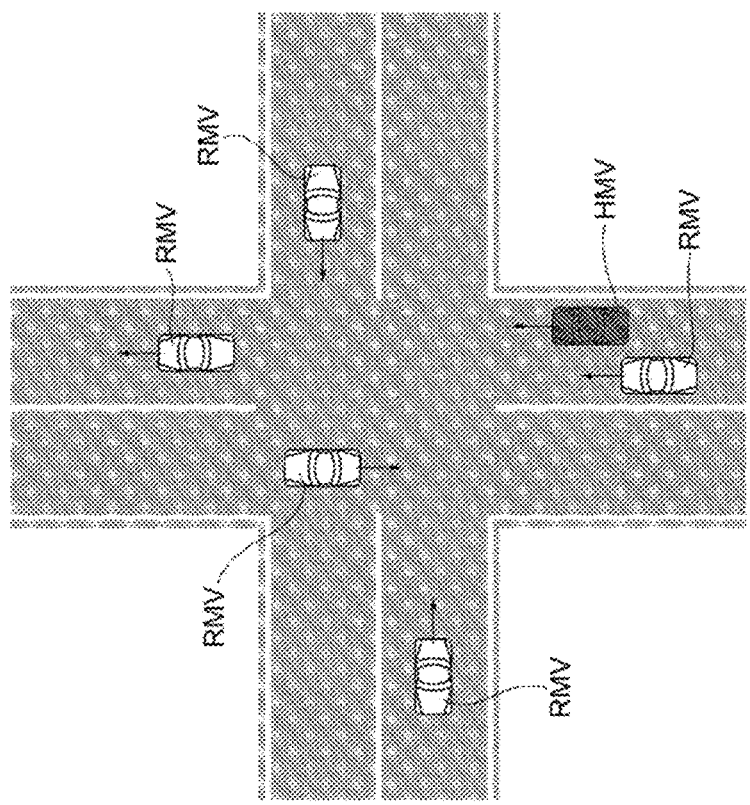
FIG. 3 shows a schematic representation of a motor-vehicle driving scenario in which a motor-vehicle is approaching an intersection.

This information may then be used by the automotive on-board systems of the Host Motor-Vehicle to assist the driver of the Host Motor-Vehicle in driving the Host Motor-Vehicle in any driving scenario, for example the one schematically shown in FIG. 3, in which the Host Motor-Vehicle is indicated with HMV and the Nearby Motor-Vehicles are indicated with RMV, so as to increase the safety of all the motor-vehicles involved.

As it is known, Basic Safety Messages are safety messages transmitted by motor-vehicles to Nearby Motor-Vehicles in order to provide them with situational information, such as position, direction, speed, etc., which allows them to assess possible threats.

Basic Safety Messages are especially created for a low-latency, localized V2V broadcast through a DSRC antenna, which has a radio coverage of approximately 1 km, and are not stored on the transmitting motor-vehicle.

The transmission of Basic Safety Messages takes place according to two criteria: either periodically (Periodic Basic Safety Message Broadcast), every 100 ms, or upon occurrence of an event (Event-Driven Basic Safety Message Broadcast).

Figure 4:
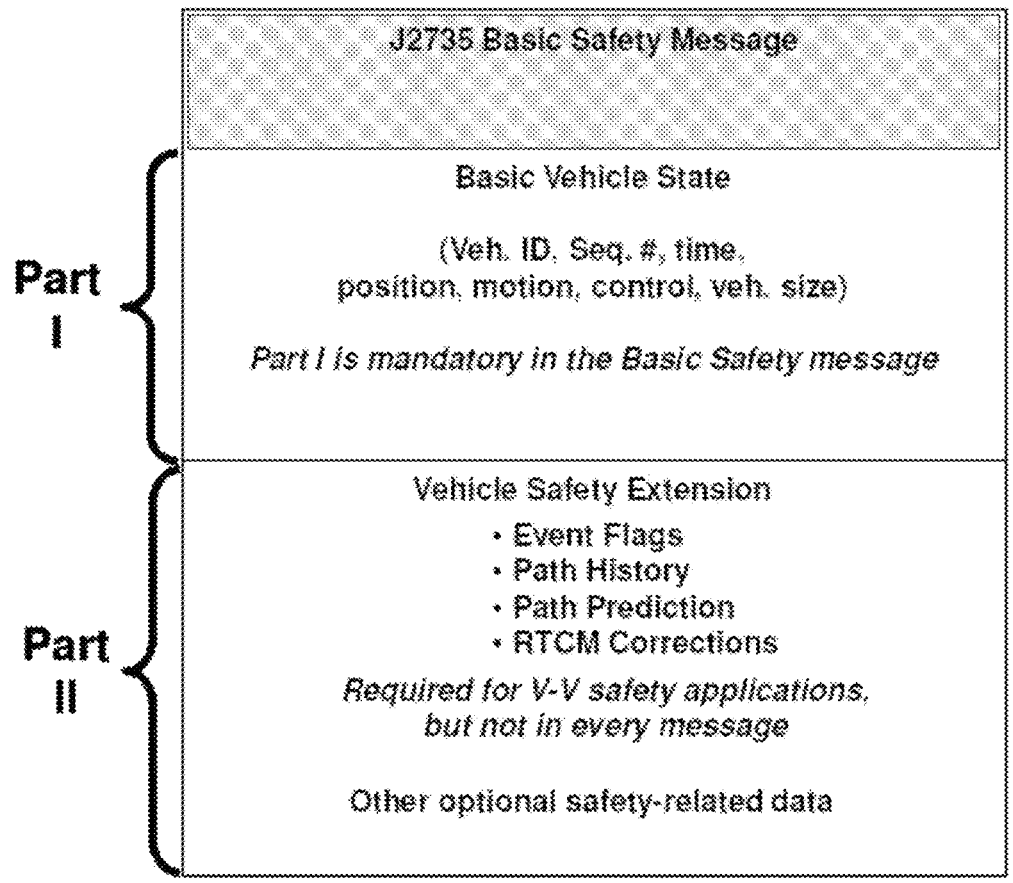
FIG. 4 shows a schematic representation of a Basic Safety Message provided for by the SAE J2735 standard.

As shown in FIG. 4, Basic Safety Messages consist of two parts, which contain different information and are transmitted with different frequencies:

a first compulsory part (BSM Part 1) which is transmitted every 100 ms and contains key information, such as motor-vehicle size, position, speed, direction, longitudinal acceleration, brake system status in turn comprising brake applied status, traction control status, anti-lock brake status and stability control status, and a second optional part (BSM Part 2) which is transmitted less frequently than the first part, is added to the first part depending on the occurrence of given events, for example ABS activation, and contains variable additional information comprising weather information, such as ambient temperature and pressure, and vehicle information, such as external light activation state, wiper activation state, rain sensor state, road friction, yaw, etc.

In the US standard, the relevant Infrastructure Messages transmitted by the infrastructure are:

Road Side Alert (RSA): message to warn motor-vehicles of specific and temporary road events, such as, for example, presence of ice on the road, presence of emergency vehicles, i.e., ambulances, presence of men at work on the road. The message indicates the type of event with the respective reference position and the corresponding time validity. A distance of applicability of the message and a priority are also indicated in the message (for example according to the IEEE 1609 standard) so that he motor-vehicle can decide how to interpret the message;

Traveller Information Message (TIM): message sent to inform motor-vehicles of possible events mainly concerning road behaviours to be adopted (speed limits) and road signs. The message also specifies the activation, the activation duration time (minutes) and the area of applicability of the event of the message;

Signal Phase And Timing Message (SPAT): message to inform motor-vehicles of the state of road elements with relative time validities. At an intersection controlled by traffic lights, for example, the information sent relates to the state of the traffic lights and of the traffic control systems: type of phase (green, red, blinking yellow, etc.) and time of change of the following traffic light phases. The message could further include the prohibition to access specific areas at given hours: restricted traffic areas only during the day or periodic scheduled road cleaning; and Map Data Message (MAP): message to provide motor-vehicles with geographical information concerning the road. The message can describe the topology of road intersections or of specific road segments: geographical coordinates of the road segment or intersection, number of lanes, motor-vehicles allowed to use them, allowed driving direction. The message also contains geographical information describing the area of validity, which is what happens in case the extension of a restricted traffic area must be described.

Similar infrastructure and vehicle messages are present in the European standard. In particular, RSA and TIM messages are replaced with DENM (Decentralized Environmental Notification Message) messages and IVIM (Infrastructure-to-Vehicle Information Message) messages, and SPAT and MAP messages have been completely absorbed in the European standard, with the addition of a suffix to make them compatible with the format established in Europe; indeed, in the ETSI ITS-G5 standard, they are called SPATEM (SPAT-Extended Message) messages and MAPEM (MAP-Extended Message) messages, whereas BSM messages are replaced by CAM (Cooperative Awareness Message) messages, which, unlike what happens in the USA, are transmitted both by motor-vehicles and by the infrastructure.

With reference again to FIG. 2, the automotive standalone on-board unit 1 comprises a number of hardware and software modules comprising, among the other:

a GNSS Receiver Module 5 to receive radio signals, known as Signals In Space (SIS), transmitted by a constellation of satellites of a Global Navigation Satellite System (GNSS) (GPS, GALILEO, GLONASS, BEIDOU), and to compute, based on the received SIS, data indicative of the absolute position, in terms of latitude, longitude, height, direction, and time, of the Host Motor-Vehicle on which the GNSS receiver is installed;

a V2X Communication Module 6 operable to establish a V2V communication and, conveniently, though not necessarily, a V2I communication and, in the example shown herein, comprising a V2X data encoder 7 configured to encode data flows into RF signals to be transmitted through a DSRC antenna, and a V2X data decoder 8 configured to decode RF signals received from a DSRC antenna into data flow, according to the SAEJ2735 standard data format;

a Host Motor-Vehicle Path History Reconstruction Module 9 designed to compute a representation of an adjustable and concise path history of the recent movements of the Host Motor-Vehicle based on the chronology of the GNSS positions assumed by the Host Motor-Vehicle;

a Host Motor-Vehicle Path Prediction Module 10 designed to compute a (continuous) bending radius of the Host Motor-Vehicle based on dynamics information of the Host Motor-Vehicle, so as to provide an estimation of the most probable path of the Host Motor-Vehicle. Further information, such as, for example, the databases of the digital maps and of the travel destination, etc., could be used to improve the general prediction of the path, as described more in detail below;

a Dead Reckoning Module 11 designed to compute an estimated position of the Host Motor-Vehicle using motion-related data present on the CAN bus, such as speed, direction, and way, and a Target Selection Module 12 designed to identify the motor-vehicles nearby the Host Motor-Vehicle that could be potential threats for the driving safety of the Host Motor-Vehicle and to dispatch on the CAN bus of the Host Motor-Vehicle information on the Nearby Motor-Vehicles for use by those automotive on-board systems of the Host Motor-Vehicle and by the above-indicated SAE applications, and indicated with reference numeral 13, that need it to implement or improve the relevant functions for which they are designed, as explained more in detail below. This module further selects the Infrastructure Messages that are deemed to be relevant for the Host Motor-Vehicle in relation to its path and, in particular, direction, approach, lane, distance, Host Motor-Vehicle typology, as described more in detail below. As to the estimation of the above-mentioned most probable path of the Host Motor-Vehicle, this is conveniently estimated based on the current position and up to an electronic horizon of the Host Motor-Vehicle, whose meaning is explained below.

As it is known, ADAS usually receive inputs from sensors that observe the space surrounding the motor-vehicles and that are limited in terms of detection distance and angle of vision. The space behind objects, besides being a few metres further, is not commonly visible.

Therefore, the electronic maps of the automotive global navigation satellite system have been proposed to be used as additional sensor to see beyond curves, and this "map as a sensor" is commonly referred to as electronic horizon, which represents the road network and its attributes in front of the motor-vehicles up to a given calibratable distance in front of the motor-vehicles, which may range, depending on the use, from a few hundred metres to some kilometres.

Hence, the electronic horizon of a motor-vehicle indicates the possible paths along which the motor-vehicle can travel from its current position to up to a given distance in front of the motor-vehicle. For every possible path within the electronic horizon, the latter may include one or more intersections through which the driver may drive the motor-vehicle. A probability may be assigned to each possible path identified within the electronic horizon and the probabilities may be based on the manoeuvres that the driver will most likely make at every intersection identified within the electronic horizon. Determining the most and least probable paths to be driven by the motor-vehicle at every intersection within the electronic horizon may be based on a predetermined classification of all the possible paths that may be driven at that intersection, taking into account statistic information concerning the road network, such as bending radii of the curves, class of road functions, road signs, and speed limits, or dynamic information, such as direction indicators, driving chronology, driving speed, etc.

Therefore, the electric horizon of a motor-vehicle basically is a collection of data identifying the roads and the intersections along which the motor-vehicle may drive from its current position and up to a given distance in front of the motor-vehicle, as well as potential paths that may be driven by the motor-vehicle from its current position.

Each motor-vehicle provided with an automotive global navigation satellite system may generate its own electronic horizon and supply it to other motor-vehicles or electronic devices designed to receive and process the received electronic horizons. The electronic horizons may also be stored in a data storage device as a motor-vehicle. data set.

Further details concerning the electronic horizons of motor-vehicles are disclosed, for example, in U.S. Pat. Nos. 6,450,128 B1, 6,735,515 B1, 8,717,192 B2, 9,330,564 B2 9,799,216 B2, to which reference is made.

Among the above-mentioned hardware and software modules of the automotive standalone on-board unit 1, the Target Selection Module 12 represents the core of the invention and, therefore, its operation will be described more in detail hereinafter.

With reference to the above-considered double approach, two distinct scenarios as well as a combination thereof are possible: in the first case in which the six above-listed SAE applications and possible V2I applications and/or combined V2V-V2I applications are implemented in the automotive standalone on-board unit 1, the Target Selection Module 12 provides information to enable/show to the driver of the Host Motor-Vehicle suitable warnings or driving indications through an automotive human-machine interface (not shown), whereas, in case the automotive standalone on-board unit 1 is used only as object or obstacle sensor, the Target Selection Module 12 only dispatches on the CAN bus a list of virtual objects containing, as described more in detail below, information obtained through processing of the information contained in the:

Basic Safety Messages received from Nearby Motor-Vehicles and which, as explained more in detail below, are deemed to be relevant for those applications, in particular the above-indicated SAE applications, that need them to provide or improve the functionality for which they are designed; and Infrastructure Messages (TIM, RSA, SPaT, MAP) received from an infrastructure, which represent events, limits, signs, traffic light phases, and road configurations in the immediate proximity of the Host Motor-Vehicle and significant for the path of the Host Motor-Vehicle.

Figure 5:
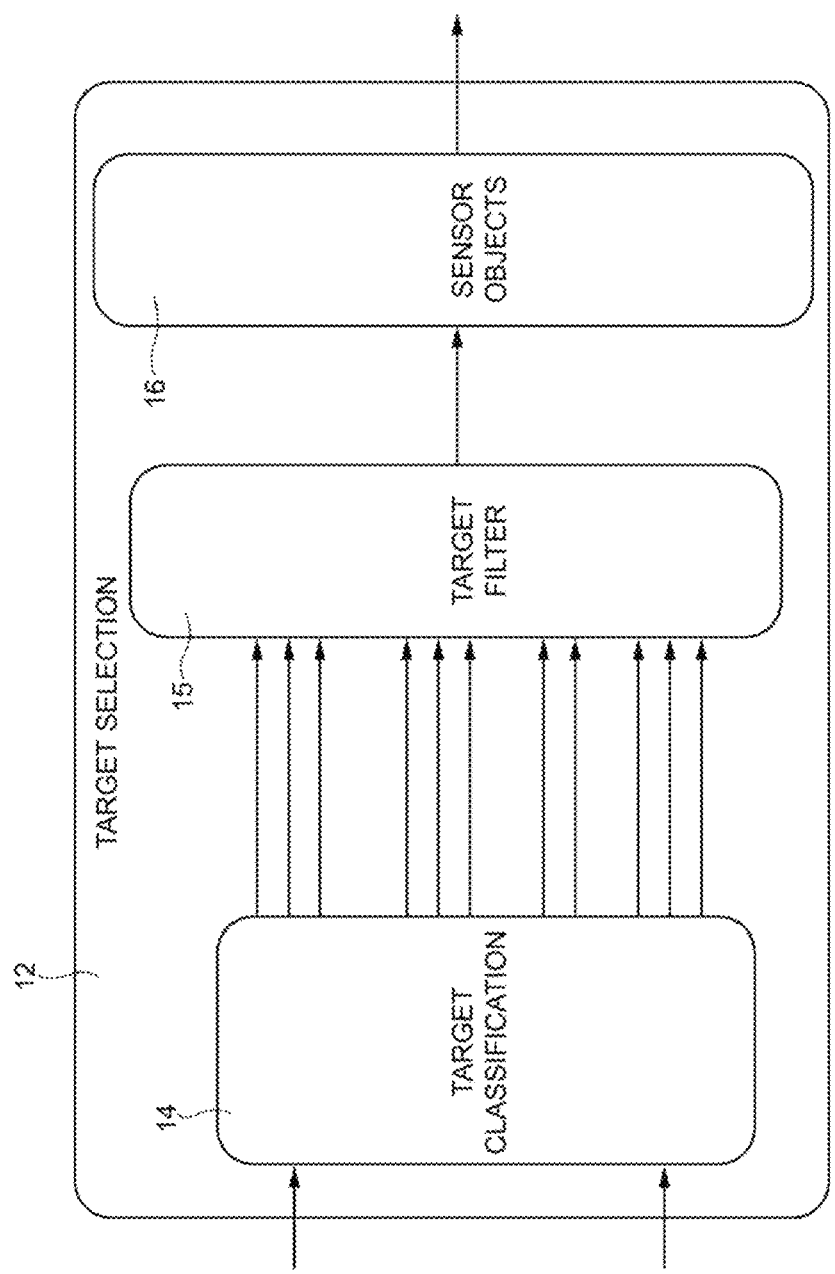
FIG. 5 shows a high-level block diagram of a target selection module in FIG. 2.

FIG. 5 shows a logic block diagram of the Target Selection Module 12, which is configured to implement the following macro-operations:

Target Classification 14,
Target Filtering 15, and
Sensor Objects Dispatching 16.

In the Target Classification 14, Remote Motor-Vehicles in the communication range of the V2V Communication System of the Host Motor-Vehicle and communicating with the latter through Basic Safety Messages are classified as Nearby Motor-Vehicles or Non-Nearby Motor-Vehicles based on a predefined driving safety criterion and on motor-vehicle position-related, motion-related, and state-related data contained in the received Basic Safety Messages as well as on those of the Host Motor-Vehicle, thus creating a list of Nearby Motor-Vehicles.

In particular, the Remote Motor-Vehicles are classified as Nearby Motor-Vehicles if, based on the predefined driving safety criterion and on the motor-vehicle position-related, motion-related, and state-related data contained in the received Basic Safety Messages as well as on those of the Host Motor-Vehicle, they are deemed to be capable of potentially adversely affecting, in particular of being potential threats for, the driving safety of the Host Motor-Vehicle along one, in particular the most probable one, or more of the possible paths of the Host Motor-Vehicle from its current position, namely those Remote Motor-Vehicles that are moving along paths that may intersect one, in particular the most probable one, or more of the possible paths of the Host Motor-Vehicle from its current position and in directions that are such as to cause the Remote Motor-Vehicles to represent potential obstacles against which the Host Motor-Vehicle could collide.

Furthermore, in the Target Classification 14, the received Infrastructure Messages may conveniently be classified into Infrastructure Messages relating to road events (RSA messages) and Infrastructure Messages relating to road elements, signs, and configurations (MAP messages).

In the Target Filtering 15, the list of Nearby Motor-Vehicles is filtered according to a predefined filtering criterion, so as to create a list of Relevant Motor-Vehicles that are relevant to the automotive applications of the Host Motor-Vehicle, in particular for the six above-listed SAE applications, namely Nearby Motor-Vehicles whose Basic Safety Messages received by the Host Motor-Vehicle contain motor-vehicle position-related, motion-related, and state-related data that may be used in the implementation of one or more of the automotive functionalities aimed at assisting the driver in driving the Host Motor-Vehicle, controlling the Host Motor-Vehicle, and informing the driver of the Host Motor-Vehicle on the presence of Relevant Motor-Vehicles deemed to be relevant to the driving safety of the Host Motor-Vehicle along one or more of the possible driving paths of the Host Motor-Vehicle from its current position thereof.

Furthermore, in the Target Filtering 15 the list of road events, elements, signs, and configurations indicated in the Infrastructure Messages is filtered in a way that is similar to the one adopted for the list of Nearby Motor-Vehicles, so as to select the road events, elements, signs, and configurations deemed to be relevant to the automotive applications of the Host Motor-Vehicle, in particular for the six above-listed SAE applications, namely road events, elements, signs, and geometries located along one or more of the possible paths of the Host Motor-Vehicle from its current position, and whose data may be used in the implementation of one or more of the automotive functionalities aimed at assisting the driver in driving the Host Motor-Vehicle, controlling the Host Motor-Vehicle, and informing the driver of the Host Motor-Vehicle on the presence of road events, elements, signs, and configurations along one or more of the possible driving paths of the Host Motor-Vehicle from its current position.

In the Sensor Objects Dispatching 16, the information contained in the Basic Safety Messages transmitted by Relevant Motor-Vehicles are processed and a list of virtual objects is dispatched on the CAN bus of the Host Motor-Vehicle, which list of virtual objects contains information on the Host Motor-Vehicle and on the Relevant Motor-Vehicles, in the example discussed herein to the considered SAE applications, for use by one or more of the automotive functionalities implemented by the electronic control units of the automotive on-board systems of the Host Motor-Vehicle and aimed at assisting the driver in driving the Host Motor-Vehicle, controlling the Host Motor-Vehicle, and informing the driver of the Host Motor-Vehicle on the presence of Relevant Motor-Vehicles deemed to be relevant to the safety of the Host Motor-Vehicle along one or more of the possible driving paths of the Host Motor-Vehicle from its current position.

As an alternative to or in combination with what disclosed above, the information on the Host Motor-Vehicle and on the Relevant Motor-Vehicles may be completely or partly used by the automotive standalone on-board unit 1 to autonomously implement one or more of the automotive driver assistance functionalities aimed at assisting the driver in driving the Host Motor-Vehicle, controlling the Host Motor-Vehicle, and informing the driver of the Host Motor-Vehicle of the presence of the Relevant Motor-Vehicles deemed to be relevant to the safety of the Host Motor-Vehicle along one or more of the possible driving paths of the Host Motor-Vehicle from its current position.

Furthermore, in the Sensor Objects Dispatching 16, the information contained in the Infrastructure Messages are processed and a list of virtual objects is dispatched on the CAN bus of the Host Motor-Vehicle, which list of virtual objects contains information on road events, elements, signs, and configurations along one or more of the possible driving paths of the Host Motor-Vehicle from its current position, and whose relevant data may be used in the implementation of one or more of the automotive functionalities aimed at assisting the driver in driving the Host Motor-Vehicle, controlling the Host Motor-Vehicle, and informing the driver of the Host Motor-Vehicle of road events, elements, signs, and configurations along one or more of the possible driving paths of the Host Motor-Vehicle from its current position.

As an alternative to or in combination with what disclosed above, the information on road events, elements, signs, and configurations along one or more of the possible paths of the Host Motor-Vehicle from its current position may be completely or partly used by the automotive standalone on-board unit 1 to autonomously implement one or more of the automotive driver assistance functionalities aimed at assisting the driver in driving the Host Motor-Vehicle, controlling the Host Motor-Vehicle, and informing the driver of the Host Motor-Vehicle of road events, elements, signs, and geometries along the possible driving paths of the Host Motor-Vehicle from its current position.

The entire target selection process is carried out periodically, for example every 100 ms, which is a reasonable amount of time for the frequency of transmission of the Basic Safety Messages, which, as a standard, is typically 10 Hz and may be slowed down up to 1 Hz in congested situations. In this way, operating at the maximum frequency, the scenario around the Host Motor-Vehicle is updated after 100 ms.

Figure 6:
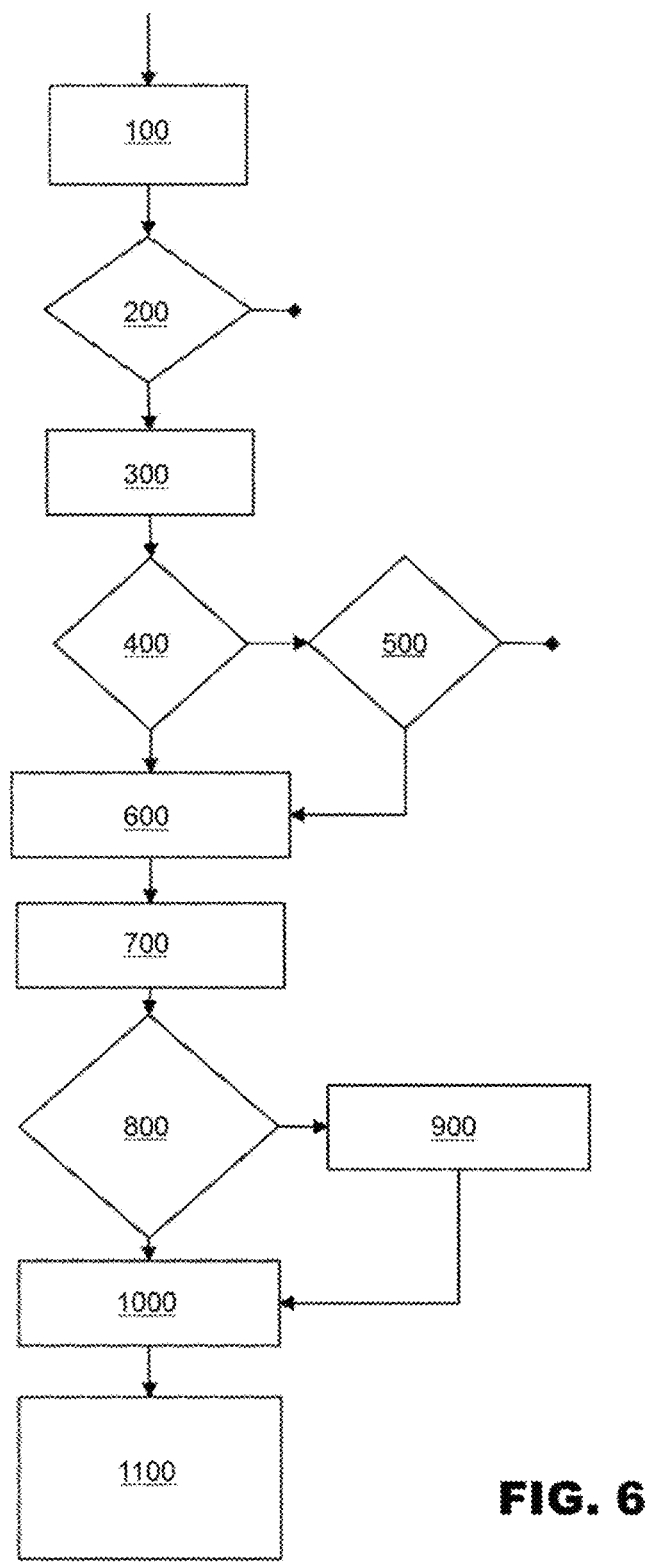
FIG. 6 shows a flowchart of the operations carried out by the target selection module shown in FIG. 5.

FIG. 6 shows a flowchart of the operations carried out by the Target Selection Module 12 in a challenging scenario in relation to the Remote Motor-Vehicles (RMVs). Indeed, whereas for the road events, elements, and signs some dozens of messages per second may be expected, for the Remote Motor-Vehicles one or two orders of magnitude may be expected (100 or even 1000 communicating motor-vehicles), depending on how heavy the traffic is. This is confirmed by the state of the art on DSRC communications, wherein a DSRC on-board unit must be capable of processing up to 2000 messages per second. For this reason, in the description below, the operations carried out by the Target Selection Module 12 will be described in relation to the sole Remote Motor-Vehicles.

As shown in FIG. 6, Target Classification 14 basically comprises performing the following operations for each Remote Motor-Vehicle from which Basic Safety Messages are received:

associating the Remote Motor-Vehicles from which Basic Safety Messages are received with relevance areas of the Host Motor-Vehicle, conveniently with the relevance areas provided for in the SAE J2945 standard, such as the areas on the left, on the right, at the centre, at the front, etc. of the Host Motor-Vehicle (block 100);

determining, based on the outcome of the association, which Remote Motor-Vehicles from which Basic Safety Messages are received are within relevance areas of the Host Motor-Vehicle (block 200);

rejecting the Basic Safety Messages received from Remote Motor-Vehicles that are not within the relevance areas of the Host Motor-Vehicle (NO output of block 200), and adding the Remote Motor-Vehicles within relevance areas of the Host Motor-Vehicle to the list of Nearby Motor-Vehicles and storing the Basic Safety Messages received therefrom, labelling the Basic Safety Messages with identifying codes of the transmitting Nearby Motor-Vehicles (YES output of block 200).

The relevance areas of the Host Motor-Vehicle may conveniently be parameterized so as to be customizable and to allow the system precision to be definable. In particular, the relevance areas could, for example, be made dependant on the speed of the Host Motor-Vehicle; for example the front area could have a linear extension proportional to the safety distance.

To give an approximate idea of the number of Basic Safety Messages that can be involved in the Target Classification 14 in a potentially critical scenario of a crowded motorway with up to 4 lanes and taking into account, like in the NPRM, a communication range of the V2V communication system with a circular shape and with a 300 m radius, the Target Classification 14 reduces the number of Nearby Motor-Vehicles in the front and rear areas of a Host Motor-Vehicle and deemed to be relevant for the SAE applications from some hundreds to a few dozens.

Target Filtering 15 is designed to filter the list of Nearby Motor-Vehicles, conveniently according to a filtering criterion based on two quantities: time to collision (TTC) and relevant event flags.

In particular, filtering of the list of Nearby Motor-Vehicles basically involves, for each Nearby Motor-Vehicle in the list of Nearby Motor-Vehicles, the following operations:

computing the time to collision of the Nearby Motor-Vehicle with the Host Motor-Vehicle, namely the time needed by the Nearby Motor-Vehicle to reach and hit the Host Motor-Vehicle, wherein if the trajectory of the Nearby Motor-Vehicle never crosses the trajectory of the Host Motor-Vehicle, this corresponds to an infinite time to collision (block 300). The time to collision may be computed, for example, based on motor-vehicle information history (sequence of points–history of the positions), whereas digital maps and further information may be used to improve the estimate (see the Path Prediction Module above), if available;

comparing the computed time to collision with a threshold value, for example of some seconds (block 400), if the time to collision is determined to exceed the threshold value (NO output of block 400), checking for the presence of event flags in the Basic Safety Messages received from the Nearby Motor-Vehicle (block 500), which, in the specific case of the considered six SAE applications, are the flags of the electronic emergency brake lights (EEBL) and of control loss warning (CLW), which are included in the Basic Safety Massages sent by a Nearby Motor-Vehicle when it is braking to such an extent as to cause a deceleration of the Nearby Motor-Vehicle that exceeds a given threshold or when the Nearby Motor-Vehicle loses grip, rejecting the Basic Safety Messages transmitted by the Nearby Motor-Vehicle as long as it is determined that the time to collision exceeds the threshold value and the Basic Safety Messages from the Nearby Motor-Vehicle do not contain event flags (NO output of block 500), which, in the specific case of the considered six SAE applications, are the flags of the electronic emergency brake lights (EEBL) and of control loss warning, and adding the Nearby Motor-Vehicle to the list of Relevant Motor-Vehicles when the time to collision is determined to be either below the threshold value or higher than the threshold value but the Basic Safety Messages from the Nearby Motor-Vehicle contain event flags (block 600).

In the above-considered crowded motorway scenario, a Nearby Motor-Vehicle proceeding the Host Motor-Vehicle of approximately a hundred metres, basically at the same speed and in the same direction, is not added to the list of Relevant Motor-Vehicles because it is not about to collide with the Host Motor-Vehicle and is not in critical driving conditions, whereas a Nearby Motor-Vehicle that precedes the Host Motor-Vehicle and travels in an adjacent lane, hence, has a trajectory that does not intersect the one covered by the Host Motor-Vehicle, but has abruptly started braking, is added to the list of Relevant Motor-Vehicles because it is not about to collide with the Host Motor-Vehicle but it is in critical driving conditions, as well as a Nearby Motor-Vehicle that is travelling in front of the Host Motor-Vehicle and is slowing down is also added to the list of Relevant Motor-Vehicles because it represents a potential collision threat.

The Sensor Objects Dispatching 16 is designed to dispatch information on the CAN bus of the Host Motor-Vehicle conveniently in the following way:

sorting the list of Relevant Motor-Vehicles based on the time to collision (block 700), determining whether the list of Relevant Motor-Vehicles has a length higher than an allowed maximum length, namely it contains a number of Relevant Motor-Vehicles exceeding an allowed maximum number (block 800), removing from the list of Relevant Motor-Vehicles those with higher times to collision until the length of the list of Relevant Motor-Vehicles becomes equal to the allowed maximum length (block 900), thus generating a reduced list of Relevant Motor-Vehicles, and dispatching the reduced list of Relevant Motor-Vehicles on the CAN bus (block 1000), in the appropriate data format (block 1100).

The allowed maximum number of Relevant Motor-Vehicles is determined during the design phase of the ADAS and depends on limits of the CAN bus and on other factors, the majority of which depend on the possibility to scale the ADAS, in particular the available bandwidth of the CAN bus. In the current state of the art, the bandwidth generally available for automotive CAN buses allows for the management of approximately ten Relevant Motor-Vehicles.

The Sensor Objects Dispatching 16 is further designed to dispatch on the CAN bus of the Host Motor-Vehicle, in an appropriate data format, virtual objects containing information on the Host Motor-Vehicle and on the Relevant Motor-Vehicles deemed to be relevant to the considered SAE applications and concerning the Relevant Motor-Vehicles listed in the reduced list of Relevant Motor-Vehicles outputted by the Target Filtering 15.

In an embodiment, information dispatched on the CAN bus may comprise, for each Relevant Motor-Vehicle: the timestamp (time elapsed between receipt of the messages), the relative position of the Relevant Motor-Vehicle relative to the Host Motor-Vehicle and the precision confidence, the driving direction, the driving speed, the yaw angle, the acceleration, the light indicator state, the steering angle, the state of the Relevant Motor-Vehicle (parked, moving, in reverse, etc.), and information on the Relevant Motor-Vehicle (length, width).

Other information may relate to events such as hard braking or ABS activation, traction control loss detected or stability control system activation and the possible activation of functions such as EEBL (electronic emergency light activated) and CLW (control loss warning).

Information on the trajectory of the Relevant Motor-Vehicle described in five position points (path history) and prediction of where the Relevant Motor-Vehicle will be in the future (path prediction), with the associated prediction precision confidence, as well as the target-classification area (position of the Relevant Motor-Vehicle relative to the Host Motor-Vehicle), and the target-classification lane proximity may also be part of the relevant information transmitted.

In addition to this information, the Sensor Objects Dispatching 16 is conveniently designed to dispatch on the CAN bus current information concerning the Host Motor-Vehicle, such as, for example, position accuracy, so that a potential receiving on-board system, for example another electronic processing unit on board the Host Motor-Vehicle, may compare the quality of the computed position information based on the SIS received by the GNSS receiver of the Host Motor-Vehicle.

Other information concerning the Host Motor-Vehicle may be: timestamp (time of generation of the messages sent), message count (counter which is increased with every BSM sent), driving direction, path prediction confidence (history of the positions of the Host Motor-Vehicle and prediction of the future positions of the Host Motor-Vehicle).

Similarly, though simpler for the Infrastructure Messages, proper algorithms allow the system to analyse the contents, check the motion of the Host Motor-Vehicle in relation to the relevance areas, select the contents of interest for the Host Motor-Vehicle, for example approaching to a specific branch of a road intersection, and finally, based on priority logics (distance and time to reach the event/element/sign and priority of the event contained in the message), and optimization of the data traffic on the CAN bus, send virtual objects corresponding to the selected V2I information, so as to enable possible applications on this or another control unit.

Compared to the prior art solutions based on physical measurements carried out by means of on-board sensors, such as, for example, light and microwave detection and ranging, sonar, lidar, cameras, etc., the ADAS of the invention offers better performances and operating conditions because:

it operates also with motor-vehicles outside the field of vision (when the communication does not take place in the field of vision because it is blocked by obstacles), it operates at 360 degrees around the transmitting and receiving antenna (according to the requirements defined by the SAE standard), it operates in a more extended range of distances, it is more flexible than traditional ADAS sensors because it provides more information than a physical detection (which only provides information on the kinematics of the motor-vehicles), also including information on the driving intentions (for instance, the turning by means of activated direction indicators and steering angle), when it is applied to different types of motor-vehicles and road users, for example pedestrians, it allows for a classification of the type of object detected based on the information sent by the object itself (car, motorcycle, ambulance, pedestrians, etc.), and it can be further extended with infrastructure-based information (V2I). For example, information on the state of the traffic light phase could be outputted on the CAN bus of the Host Motor-Vehicle as virtual object and the relevant attributes could be the time to change, the current phase and the next phase of the traffic light.

Furthermore, compared to a prior art V2X communication system which integrates V2V applications, the ADAS of the invention features the main advantage of being flexible and of facilitating the development of the system in an industrial environment. Indeed, depending on the development needs, the ADAS of the present invention can be easily customized so as to provide information aimed at developing standalone basic application, integrated advanced applications and new applications.

Standalone signalling applications are functionalities providing warnings exclusively based on V2V communications in all basic scenarios, for example in SAE J2945 for the six applications EEBL, FCW, LCW, IMA, LTA, CLW. These applications are affected by technological limits: complete dependence on the GNSS, decrease of performances in crowded city environments (caused by the urban-canyoning phenomenon because of GNSS and RF problems—multipath GNSS, fading RF).

Integrated applications improve or extend the functionalities of the aforesaid applications, e.g. EBL, FCW, LCW, IMA, LTA, CLW, as part of the existing functionalities, through the melting of output data of the V2V communication system with the output of other sensors. In this case there can be both the signalling and the activation, depending on the functionality. For example:

the virtual objects enabling the SAE J2945 applications of EEBL, CLW and FCW can be used in an existing front collision warning functionality, thus also allowing for the detection of further motor-vehicles relative to the current system and for the recognition of events such as, for example, pre-loading of the ESC or of similar systems of the motor-vehicle, the virtual objects enabling the SAE J2945 application of LCW can be used in an existing lane change functionality, since they improve the field of vision and provide redundancy relative to the RADAR, as independent source of information (useful for self-driving), the virtual objects enabling the SAE J2945 application of IMA could be useful for an existing intersection collision avoidance (ICA) functionality, as it improves the field of vision, thus allowing for different geometries of road intersections relative to the standard 90-degree standard intersection, and the line of vision, especially taking into account lateral obstacles of the field of vision caused by buildings and parked cars, and the virtual objects enabling the SAE J2945 application of LTA could improve the existing left turn assistance functionality, since it is capable of recognizing the left turn scenario regardless of the other sensors, such as the camera. In particular, it can recognize the lane based on switched trajectories and can ensure good performances even in the absence of lane signs.

On the outside of the perimeter of the SAE J2945 applications, the advanced driver assistance system could also feature the automotive driver assistance functionality for assisting a motor vehicle driver in negotiating a roundabout, which is the subject-matter of international patent application no. WO 2017/098486 of the Applicant, whose content is included herein.

The invention described herein can also be implemented considering, instead of the SAE J2735 and J2945 standard, the ETSI ITS-G5 communication protocol, which is based on the IEEE 802.11p standard and, hence, can use the same hardware architecture. In this case, the realization is basically the same, since the information sent through BSM, TIM, RSA, SPAT, MAP is similar to the one sent by the corresponding CAM, DENM (specific type of BSM reserved to events), IVIM (messages including the contents of the road signs as well as the signalling of infrastructures and covering the cases of TIM and RSA), SPaTEM and MAPEM (counterparts of SAE J2735 SPaT and MAP).

Furthermore, the invention can easily be extended and transferred to other communication protocols which allow for the development of V2X applications and services, such as the emergent cellular technologies Cellular-V2X (C-V2X) and the future 5G, through the interfaces referred to as "PC5" and "Uu" in the state of the art, which are dedicated to the local vehicle-to vehicle and vehicle-to infrastructure communication, respectively.

The invention claimed is:

1. An automotive advanced driver assistance system for a Host Motor-Vehicle (HMV) and configured to implement one or different automotive V2V applications designed to assist a driver in driving the Host Motor-Vehicle (HMV);

the advanced driver assistance system comprises an automotive standalone on-board unit designed to be installable on the Host Motor-Vehicle (HMV) and to be connectable to an automotive on-board communication network to communicate, through the automotive on-board communication network, with one or different automotive electronic control units of one or different automotive on-board systems of the Host Motor-Vehicle (HMV) and designed to implement one or different automotive functionalities aimed at assisting the driver in driving the Host Motor-Vehicle (HMV), controlling the Host Motor-Vehicle (HMV), and informing the driver of the Host Motor-Vehicle (HMV) of Relevant Motor-Vehicles (RMV) deemed to be relevant to the driving safety of the Host Motor-Vehicle (HMV) along one or more of the possible driving paths of the Host Motor-Vehicle (HMV) from its current position;

the automotive standalone on-board unit is further designed to be connectable to a DSRC antenna designed to transmit and receive RF signals encoding Basic Safety Messages and Infrastructure Messages, and to a GNSS antenna designed to receive radio Signals in Space transmitted by a satellite constellation of a Global Navigation Satellite System (GNSS);

the automotive standalone on-board unit comprises:

a GNSS receiver designed to be connectable to the GNSS antenna and to compute, based on the Signals in Space received by the GNSS antenna, data indicative of an absolute position of the Host Motor-Vehicle (HMV) in terms of latitude, longitude, height, direction, and time;

an automotive V2V communication system designed to be connectable to the DSRC antenna and to communicate, through the DSRC antenna, with automotive V2V communication systems of Remote Motor-Vehicles (RMV) through V2V messages containing motor-vehicle position-related, motion-related, and state-related data; and an automotive V2I communication system designed to be connectable to the DSRC antenna and to communicate, through the DSRC antenna, with V2I communication systems of an infrastructure through V2I messages containing data indicating road events, elements, signs, and configurations;

the automotive standalone on-board unit is further designed to:

receive V2V messages transmitted by V2V communications systems of Remote Motor-Vehicles (RMV);

receive V2I messages transmitted by the V2I communications systems of an infrastructure;

process the data contained in the V2V and V2I messages received from Remote Motor-Vehicles (RMV) and from the infrastructure to:

identify, from among the Remote Motor-Vehicles (RMV) in communication with the Host Motor-Vehicle (HMV), Nearby Motor-Vehicles (RMV) deemed to potentially adversely affect the driving safety of the Host Motor-Vehicle (HMV) along one or more of the possible driving paths of the Host Motor-Vehicle (HMV) from its current position, based on a driving safety criterion and on the motor-vehicle position-related, motion-related, and state-related data contained in received V2V messages and on motor-vehicle position-related, motion-related, and state-related data of the Host Motor-Vehicle (HMV);

identify, from among the Nearby Motor-Vehicles (RMV), Relevant Motor-Vehicles (RMV) whose received V2V messages contain motor-vehicle position-related, motion-related, and state-related data that are usable in the implementation of one or more of the automotive functionalities aimed at assisting the driver in driving the Host Motor-Vehicle (HMV), controlling the Host Motor-Vehicle (HMV), and informing the driver of the Host Motor-Vehicle (HMV) of the presence of the Relevant Motor-Vehicles (RMV) deemed to be relevant to the safety of the Host Motor-Vehicle (HMV) along one or more of the possible driving paths of the Host Motor-Vehicle (HMV) from its current position;

select, based on the data contained in the received V2I messages and on motor-vehicle position-related, motion-related, and state-related data of the Host Motor-Vehicle (HMV), road events, elements, signs, and configurations along one or more of the possible driving paths of the Host Motor-Vehicle (HMV) from its current position, and whose data contained in the received V2I messages may be used in the implementation of automotive functionalities aimed at assisting the driver in driving the Host Motor-Vehicle (HMV), controlling the Host Motor-Vehicle (HMV), and informing the driver of the Host Motor-Vehicle (HMV) of road events, elements, signs, and configurations along one or more of the possible driving paths of the Host Motor-Vehicle (HMV) from its current position; and implement one or both of the following operations:

dispatching on the automotive on-board communication network a list of virtual objects containing information on:

the Host Motor-Vehicle (HMV) and Relevant Motor-Vehicles (RMV) for use by one or more of the functionalities aimed at assisting the driver in driving the Host Motor-Vehicle (HMV), controlling the Host Motor-Vehicle (HMV), and informing the driver of the Host Motor-Vehicle (HMV) of the presence of Relevant Motor-Vehicles (RMV) deemed to be relevant to the safety of the Host Motor-Vehicle (HMV) along one or more of the possible driving paths of the Host Motor-Vehicle (HMV) from its current position, and road events, elements, signs, and configurations along one or more of the possible driving paths of the Host Motor-Vehicle (HMV) from its current position, and whose data contained in the received V2I messages are usable in the implementation of one or more of the automotive functionalities aimed at assisting the driver in driving the Host Motor-Vehicle (HMV), controlling the Host Motor-Vehicle (HMV), and informing the driver of the Host Motor-Vehicle (HMV) of road events, elements, signs, and configurations along one or more of the possible driving paths of the Host Motor-Vehicle (HMV) from its current position; and using the information on the Host Motor-Vehicle (HMV), on Relevant Motor-Vehicles (RMV), and on road events, elements, signs, and configurations along one or more of the possible driving paths of the Host Motor-Vehicle (HMV) from its current position in the implementation of one or more of the automotive functionalities aimed at assisting the driver in driving the Host Motor-Vehicle (HMV), controlling the Host Motor-Vehicle (HMV), and informing the driver of the Host Motor-Vehicle (HMV) of Relevant Motor-Vehicles (RMV) deemed to be relevant to the safety of the Host Motor-Vehicle (HMV) and of road events, elements, signs, and configurations along one or more of the possible driving paths of the Host Motor-Vehicle (HMV) from its current position.

2. The automotive advanced driver assistance system of claim 1, wherein the virtual objects contain information:
in relation to each of the Relevant Motor-Vehicles (RMV), one or more of V2V message receipt times, relative position to the Host Motor-Vehicle (HMV), travel direction and speed, yaw angle, acceleration, direction indicator operating state, steering angle, operating state, longitudinal and transverse sizes, important brakings, ABS activation, loss of driving stability or control, and possible activation of functions such as Electronic Emergency Light Activated (EEBL) and Control Loss Warning (CLW), path history and path prediction, target-classification area, and target-classification lane proximity; and
in relation to the Host Motor-Vehicle (HMV), one or more of precision of the position computation based on Signals in Space (SIS) received from the GNSS receiver of the Host Motor-Vehicle (HMV), transmitted V2V message generation times, transmitted V2V message count, travel direction, position history, and position predictions.

3. The automotive advanced driver assistance system of claim 1, further configured to create the list of virtual objects by:
creating a list of Nearby Motor-Vehicles (RMV) in communication with the Host Motor-Vehicle (HMV), based on the received V2V messages;
filtering the list of Nearby Motor-Vehicles (RMV) to create a list of Relevant Motor-Vehicles (RMV) whose V2V messages contain motor-vehicle position-related, motion-related, and state-related data that can be used in the implementation of one or more of the automotive functionalities aimed at assisting the driver in driving the Host Motor-Vehicle (HMV), controlling the Host Motor-Vehicle (HMV), and informing the driver of the Host Motor-Vehicle (HMV) of the Relevant Motor-Vehicles (RMV) deemed to be relevant to the safety of the Host Motor-Vehicle (HMV) along one or more of the possible driving paths of the Host Motor-Vehicle (HMV) from its current position; and
processing data contained in the V2V messages received from the Relevant Motor-Vehicles (RMV) to dispatch on the automotive on-board communication network a list of virtual objects representative of data contained in the V2V messages received from the Relevant Motor-Vehicles (RMV).

4. The automotive advanced driver assistance system of claim 3, further configured to create the list of Nearby Motor-Vehicles (RMV) by:
associating Remote Motor-Vehicles (RMV) in communication with the Host Motor-Vehicle (HMV) with relevance areas of the Host Motor-Vehicle (HMV), based on the V2V messages received from the Remote Motor-Vehicles (RMV);
determining whether the Remote Motor-Vehicles (RMV) are located within or outside of the associated relevance areas of the Host Motor-Vehicle (HMV); and
adding to the list of Nearby Motor-Vehicles (RMV) those Remote Motor-Vehicles (RMV) that are within the associated relevance areas of the Host Motor-Vehicle (HMV), and storing the V2V messages received from the Remote Motor-Vehicles (RMV), along with associated identifiers.

5. The automotive advanced driver assistance system of claim 3, further configured to filter the list of Nearby Motor-Vehicles (RMV) based on times-to-collision (TTC) for the Host Motor-Vehicle (HMV) to collide with the Nearby Motor-Vehicles (RMV), and on relevant event flags.

6. The automotive advanced driver assistance system according to claim 5, further configured to filter the list of Nearby Motor-Vehicles (RMV) by:
computing, for each Nearby Motor-Vehicle (RMV), a time-to-collision (TTC) for the Nearby Motor-Vehicle (RMV) to collide with the Host Motor-Vehicle (HMV);
comparing the time-to-collision (TTC) with a threshold value;
if the time-to-collision (TTC) is higher than the threshold value, determining whether the V2V messages received from the Nearby Motor-Vehicle (RMV) contain event flags; and
adding the Nearby Motor-Vehicle (RMV) to the list of Relevant Motor-Vehicles (RMV) if it is determined that the time-to-collision (TTC) is either lower than the threshold value or higher than the threshold value but the V2V messages received from the Nearby Motor-Vehicle contain event flags.

7. The automotive advanced driver assistance system of claim 6, further configured to dispatch the list of virtual objects on the automotive on-board communication network by:
sorting the list of Relevant Motor-Vehicles (RMV) based on times-to-collision (TTC);
checking whether the list of Relevant Motor-Vehicles (RMV) has a length higher than an allowed maximum length;
in the affirmative, removing from the list of Relevant Motor-Vehicles (RMV) those with higher times-to-collision (TTC) until the length of the list of Relevant Motor-Vehicles (RMV) reduces to the allowed maximum length; and
dispatching on the automotive on-board communication network a list of virtual objects corresponding to the list of Relevant Motor-Vehicles (RMV), in a data format compliant with a communications protocol of the automotive on-board communication network.

8. The automotive advanced driver assistance systems of claim 1, further configured to create the list of virtual objects by:
classifying the received V2I messages into V2I messages relating to road events and V2I messages relating to road elements, signs, and configurations;
filtering the V2I messages relating to road events and the V2I messages relating to road elements, signs, and configurations based on approaching of the Host Motor-Vehicle (HMV) to the road events, elements, signs, and configurations to create a list of road events, elements, signs and configurations along one or more of the possible driving paths of the Host Motor-Vehicle (HMV) from its current position; and
dispatching on the automotive on-board communications network a list of virtual objects containing information on the road events, elements, signs, and configurations along one or more of the possible driving paths of the Host Motor-Vehicle (HMV) from its current position.

9. The automotive advanced driver assistance system of claim 8, further configured to create the list of relevant road events, elements, signs, and configurations by:
associating road events, elements, signs, and configurations with relevance areas of the Host Motor-Vehicle (HMV), based on the received V2I messages;

checking whether the road events, elements, signs, and configurations are located within or outside of the associated relevance areas of the Host Motor-Vehicle (HMV); and adding to the list of road events, elements, signs, and configurations those that are located within the associated relevance areas of the Host Motor-Vehicle (HMV), and storing the received V2I messages, along with associated identifiers.

\* \* \* \* \*